United States Patent
Ford et al.

(10) Patent No.: US 10,581,613 B2
(45) Date of Patent: Mar. 3, 2020

(54) CRYPTOGRAPHICALLY VERIFIABLE DATA STRUCTURE HAVING MULTI-HOP FORWARD AND BACKWARDS LINKS AND ASSOCIATED SYSTEMS AND METHODS

(71) Applicant: Ecole Polytechnique Federale de Lausanne (EPFL), Lausanne (CH)

(72) Inventors: Bryan Ford, Lausanne (CH); Linus Gasser, Echandens (CH); Eleftherios Kokoris Kogias, Ecublens (CH); Philipp Jovanovic, Prilly (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 283 days.

(21) Appl. No.: 15/618,653

(22) Filed: Jun. 9, 2017

(65) Prior Publication Data
US 2018/0359096 A1    Dec. 13, 2018

(51) Int. Cl.
*H04L 29/06* (2006.01)
*H04L 9/32* (2006.01)
*G06Q 20/22* (2012.01)
*G06Q 20/38* (2012.01)

(52) U.S. Cl.
CPC .......... *H04L 9/3247* (2013.01); *G06Q 20/29* (2013.01); *G06Q 20/382* (2013.01); *H04L 9/3236* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 2015/0269570 A1* | 9/2015 | Phan | G06Q 20/3276 705/71 |
| 2016/0191243 A1* | 6/2016 | Manning | H04L 61/1511 713/168 |
| 2016/0330034 A1 | 11/2016 | Back et al. | |
| 2017/0132621 A1* | 5/2017 | Miller | G06Q 20/3829 |
| 2018/0089641 A1* | 3/2018 | Chan | G06Q 20/0655 |
| 2018/0219669 A1* | 8/2018 | Chen | H04L 9/002 |
| 2018/0241573 A1* | 8/2018 | Ramathal | G16H 10/60 |

OTHER PUBLICATIONS

Kokoris-Kogias et al., Managing Identities Using Blockchain and Cosi, https://infoscience.epfl.ch/record/220210/files/1Managing_identities_bryan_fordetc.pdf, Jan. 1, 2016. (Year: 2016).*

(Continued)

*Primary Examiner* — Shin-Hon (Eric) Chen
(74) *Attorney, Agent, or Firm* — McCarter & English, LLP

(57) ABSTRACT

Data storage and retrieval systems, methods, and computer-readable media utilize a cryptographically verifiable data structure that facilitates verification of a transaction in a decentralized peer-to-peer environment using multi-hop backwards and forwards links. Backward links are cryptographic hashes of past records. Forward links are cryptographic signatures of future records that are added retroactively to records once the target block has been appended to the data structure.

35 Claims, 10 Drawing Sheets

(56) References Cited

OTHER PUBLICATIONS

International Search Report and Written Opinion from related Internationa Patent Application No. PCT/EP2018/065122 dated Sep. 11, 2018.
Kokoris-Kogias et al., Managing Identities Using Blockchains and CoSi, https://infoscience.epfl.ch/record/220210/files/1Managing_identities_bryan_fordetc. pdf, Jan. 1, 2016.
Kokoris-Kogias et al., Enhancing Bitcoin Security and Performance with Strong Consistency via Collective Signing, https://www.usenix.org/sites/default/files/sec16_full_proceedings_interior.pdf. Jan. 6, 2017.
Bonneau, Joseph. "EthIKS: Using Ethereum to Audit a CONIKS Key Transparency Log." Financial Cryptography Workshops (2016); 11 pages.
Kim, Tiffany Hyun-Jin et al. "Accountable key infrastructure (AKI): a proposal for a public-key validation infrastructure." WWW (2013); 11 pages.
Kokoris-Kogias, Eleftherios et al. "Enhancing Bitcoin Security and Performance with Strong Consistency via Collective Signing." 25th USENIX Security Symposium (2016); pp. 279-296.
Kokoris-Kogias, Eleftherios et al. "Managing Identities Using Blockchains and CoSi" (2016); 2 pages.
Kuppusamy, Trishank Karthik et al. "Diplomat: Using Delegations to Protect Community Repositories." 13th USENIX Symposium on Networked Systems Design and Implementation (2016); pp. 567-581.
Laurie, Ben et al. "Certificate Transparency." ACM Queue 12 (2014); 10 pages.
Melara, Marcela S. et al. "CONIKS: Bringing Key Transparency to End Users." 24th USENIX Security Symposium (2015); pp. 383-398.
Munro, J. Ian et al. "Deterministic Skip Lists." SODA (1992); pp. 367-375.
Samuel, Justin et al. "Survivable key compromise in software update systems." ACM Conference on Computer and Communications Security (2010); 12 pages.
Syta, Ewa et al. "Keeping Authorities "Honest or Bust" with Decentralized Witness Cosigning." 2016 IEEE Symposium on Security and Privacy (SP) (2016); 20 pages.

* cited by examiner

CRYPTOGRAPHICALLY VERIFIABLE DATA STRUCTURE HAVING MULTI-HOP FORWARD AND BACKWARDS LINKS AND ASSOCIATED SYSTEMS AND METHODS

BACKGROUND

The popularity of distributed databases or ledgers, such as blockchain and its derivatives, to provide decentralized secure records that are based on cryptographic proofs instead of trust has been steadily increasing in recent years. In such environments, individuals can typically enter directly into transactions with each other without the need for a trusted third party to serve as an intermediary for verifying the authenticity of the transaction.

A blockchain is a data structure composed of a chronological chain of blocks. Each block added to the chain typically contains a timestamp, a nonce, a hash of the immediately previous/last block added to the chain, and application-specific data, such as cryptocurrency transactions. Once a block is added to the chain, the block typically cannot be retroactively altered. As each block includes a hash of the immediately prior block in the chain, the hash of any given block in the chain depends on the entire prior history of the chain, forming a tamper-evident log.

As the number of transactions recorded in a blockchain increase over time, the size of the blockchain and the computing resources including memory and processor resources required to monitor and verify transactions on the blockchain also increase. For example, to verify the authenticity of a transaction between two parties on a blockchain it can be necessary that the device verifying the transaction download each block in the blockchain and verify the chain block-by-block. As a result, it can be difficult for resource constrained devices to efficiently and effectively interact with a blockchain over time. Alternatively, such resource constrained devices can cede or defer trust to a full-node. However, deferring trust to a full node to perform the verification results in a loss of the benefit of decentralized security.

In an attempt to reduce the burden of computing resources to monitor and/or verify transactions in convention blockchain-based systems, conventional blockchain-based system can employ Simplified Payment Verification (SPV), in which a verifying device downloads only the block headers (not full blocks) and a Merkle proof that a transaction of interest was included in a particular block of interest. However, the utilization of SPV can still impose a substantial bandwidth/power cost (particularly to light/thin client applications). For example, the verifying device may still have to download a new block header periodically (e.g., every ten minutes or so) for as long as the verifying device is following or monitoring the blockchain. The problem can be compounded in the event that the verifying device has not periodically downloaded new blocks as they are added to the blockchain, but wishes or needs to become current or "catch-up" by downloading and verifying the blocks added to the blockchain since the verifying device last downloaded a block. The computing resources required to catch-up can increase linearly over time without bound. For example, if the verifying device or a blockchain-following application needs to catch up with the blockchain after a long period (e.g., if it's been a month or a year since the user last ran the blockchain-following application), the quantity of new blocks added to the blockchain can increase in proportion to the period over which the new blocks were not downloaded.

Additionally, there are security weaknesses with SPV, because the SPV client is only verifying that it is seeing "a blockchain" representing a certain amount of Proof-of-Work. The SPV client does not have a way to verify that it is actually seeing the same proof-of-work blockchain that the rest of the world is seeing. As a result, a sufficiently well-motivated attacker could invest the time required to create an alternate history with the amount of work needed to trick an SPV client.

SUMMARY

Exemplary embodiments of the present disclosure advantageously address problems associated with the resource intense process of monitoring and verifying transactions/records in a distributed database or ledger in decentralized, peer-to-peer environments such as conventional blockchain-based environments. For example, exemplary systems, methods, and computer-readable media are described herein provide a data storage and retrieval system that enable client devices to efficiently and effectively verify a transaction/record in a distributed database or ledger without having to download each block on the chain and without having to cede or defer trust to a full-node (thereby losing the benefit of decentralized security). Rather, embodiments of the present disclosure provide an improved cryptographically verifiable data structure that facilitates verification of a transaction in a blockchain-based environment based on a logarithmic number of records in a chronological sequence of records.

In accordance with embodiments of the present disclosure, a method of cryptographically storing information for retrieval and verification in a decentralized network is disclosed. The method includes adding one or more new records to a cryptographically verifiable linked sequence of records, and generating, for the one or more new records added to the sequence, backwards links to previously added records by creating cryptographic hashes based on the previously added records. The method also includes retroactively adding forward links to at least one of previously added records in response to the one or more new records being added to the sequence. The backwards links and forward links include multi-hop links and a quantity of records needed to verify a select record in the sequence is a logarithmic function of a total quantity of records in the sequence or the total number of records between a known (trusted) record and the record to be verified. In accordance with embodiments, one or more non-transitory computer-readable media storing instructions is disclosed, where execution of the instructions by one or more processing devices causes the one or more processing devices to perform the method.

In accordance with embodiments of the present disclosure, a system for cryptographically storing information for retrieval and verification in a decentralized network is disclosed. The system includes nodes and a collective authority system in the decentralized network. The nodes are configured to add one or more new records to a cryptographically verifiable linked sequence of records and generate, for the one or more new records added to the sequence, backwards links to previously added records by creating cryptographic hashes based on the previously added records. The collective authority system is configured to retroactively add forward links to at least one of previously added records in response to the one or more new records being added to the sequence. The backwards links and forward links include multi-hop links and a quantity of records needed to verify a select record in the sequence is a logarithmic function of a total quantity of records in the sequence or the total number of records between a known (trusted) recorded and the record to be verified.

In accordance with embodiments of the present disclosure, a method of verifying a reference record in a cryptographically verifiable linked sequence of records is disclosed. The method includes downloading a logarithmic quantity of records from the cryptographically verifiable linked sequence of records. Each one of the records having an assigned height level that determines a quantity of backwards or forward links each one of the records includes and levels associated with the backwards or forwards links. The method also includes receiving a request to verify a first record in the sequence of records, traversing the logarithmic quantity of records according to the levels to identify a second record associated with the first record, and authenticating the first record based on authenticating the second record. In accordance with embodiments, one or more non-transitory computer-readable media storing instructions is disclosed, where execution of the instructions by one or more processing devices causes the one or more processing devices to perform the method.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

In the drawings, like reference numerals refer to like parts throughout the various views of the non-limiting and non-exhaustive embodiments.

DETAILED DESCRIPTION

Exemplary embodiments of the present disclosure relate to data storage and retrieval systems, methods, and computer-readable media that utilize a cryptographically verifiable data structure that facilitates verification of a transaction in a decentralized peer-to-peer environment using multi-hop backwards and forwards links. Backward links are cryptographic hashes of past records. Forward links are cryptographic signatures of future records that are added retroactively to records once the target block has been appended to the data structure.

Figure 1:
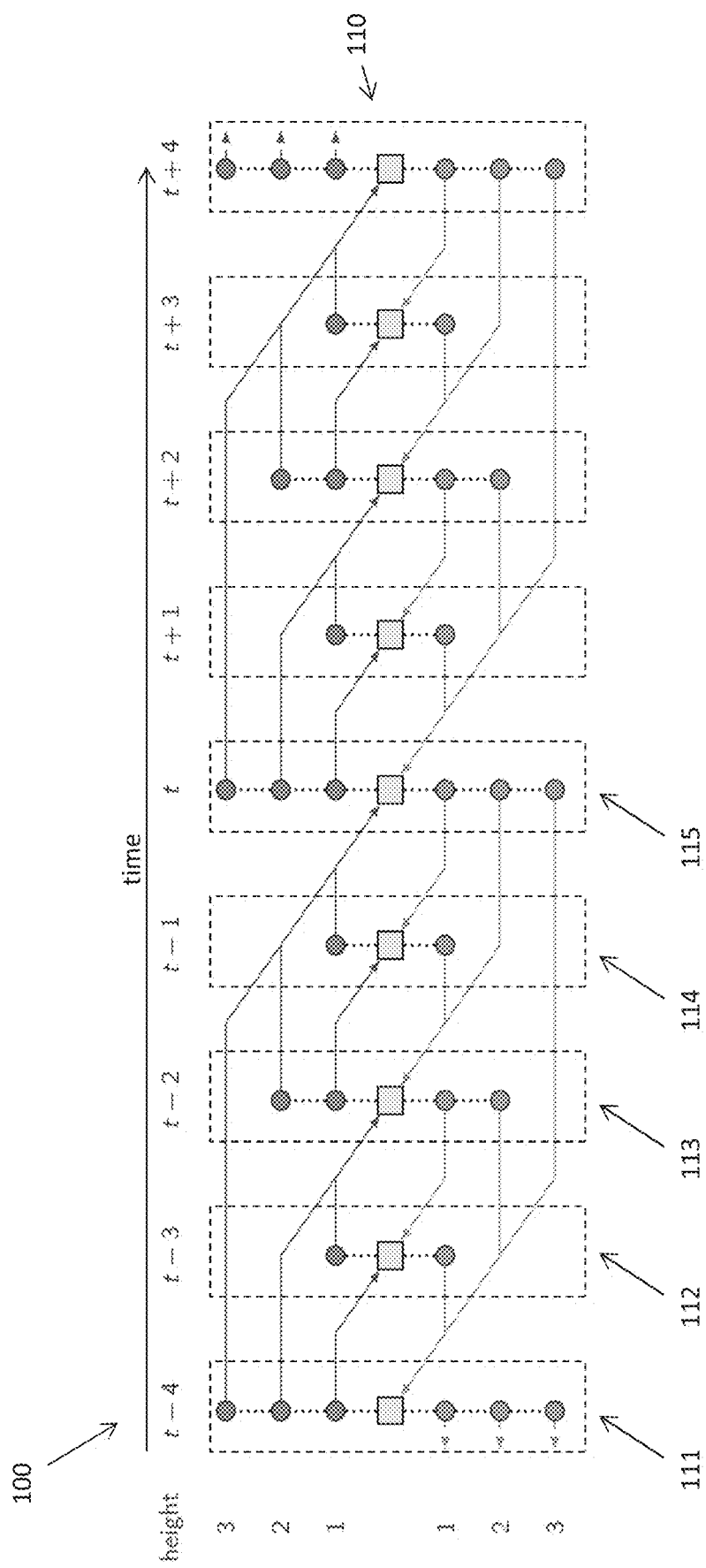
FIG. 1 is a schematic diagram illustrating an exemplary distributed cryptographically verifiable data structure having multi-hop forward and backwards links in accordance embodiments of the present disclosure.

FIG. 1 is a schematic diagram of an exemplary distributed cryptographically verifiable data structure 100 having multi-hop forward and backwards links between records 110 that can be created, maintained, monitored, and verified in data storage and retrieval system. The data structure 100 can be in the form of a database, log, ledger, or other data structure that is distributed across nodes in a decentralized peer-to-peer network environment and that stores one or more series of records 110. The one or more series of records 110 can correspond to a timeline, where a relationship of a record in the data structure to other records in the data structure can be based on a time at which the record is created. As new records are generated or formed, the new records are authenticated by one or more nodes of the decentralized peer-to-peer network and appended to the data structure 100 after the immediately previous/last record that was added. A node can be computing resource such as a server, a collection of servers (e.g., a server farm), a laptop, a personal computer, a tablet, a mobile phone, a workstation, and the like. Some of the nodes can maintain a copy of the entire data structure 100 at any given time and for any given time period (e.g., operate as full nodes). Some nodes can maintain portions of the data structure 100. Some nodes can authenticate, create, append records 110 to the data structure 100, and can add backwards and forward links to the records 110.

The records 110 in the series can include data/information about a subject/object and/or about a transfer of the subject/object from one user to another user. As one example, the subject/object can be a digital currency and the data/information captured by the records 110 can include the transfer of the digital currency between users (e.g., micro-payments). As another example, the subject/object can be smart contracts (e.g., for micro-payments, virtual investment funds, etc.) and the data/information captured by the records 110 can include the obligations and rights of the parties as well as transfers between the parties of the smart contracts. As another example, the subject/object can be a software product/application, and the data/information captured by the records 110 can include the software product/application and/or version information about the software product/application. As another example, the subject/object can be cryptographic keys, and the data/information captured by the records 110 can include changes to keys over time (to facilitate key management). As another example, the subject/object can be certificates, and the data/information captured by the records 110 can include changes to certificates over time (to facilitate certificate tracking). As another example, the subject/object can be property (real, intellectual, tangible, intangible), and the data/information can be ownership records, rights, and transfers (e.g., land records, supply chain management). As yet another example, the subject/object can be personal/professional credentials (electronic documents representing degrees earned at academic institutions, professional certificates, etc.), quality control certificates, and/or inspection certificates (e.g., elevator inspections), and the data/information captured by the records 110 can provide proof of the authenticity of the personal/professional credentials, quality control certificates, and/or inspection certificates over time. While some non-limiting examples of the subject/object for which the data structure 100 can be created and the data/information that can be captured by the records 110 are described herein, embodiments of the data structure 100 can be used for any subject/object and the records 110 can include any suitable data/information. The records 110 of the data structure 100 can include layers, where a single record can include a set of data/information for a subject/object and/or can be formed of parallel and related series of records 110 such that multiple records are created for a single event or transaction being captured by the data structure.

Embodiments of the data structure 100 can be denoted as $S_{h,b}$ where a height h is greater than or equal to one ($h \geq 1$) and a basis is greater than is greater than zero ($b > 0$). When the basis b is greater than zero and less than one ($0 < b < 1$), the data structure $S_{h,b}$ is referred to herein as a randomized data structure. When the basis b is greater than or equal to one ($b \geq 1$), the data structure $S_{h,b}$ is referred to herein as a deterministic data structure. The records 110 of the data structure $S_{h,b}$ can be denoted as $B_t^l$, where t denotes the record index (where record index is greater than or equal to zero, $t \geq 0$) and l denotes the height value (or level) assigned to the record (where the assigned height value or level l is greater than or equal to one and less than or equal to a maximum height h, $1 \leq l \leq h$). For example, the maximum height h in the data structure can be three and each record can be assigned a height value l from one to three. The index defines the logical position of the record in the data structure $S_{h,b}$ and the height assigned to the record defines a link structure of the record. At each higher level in the data structure, there an exponentially decreasing number of records, the number of hops for links between the records at each higher level increase. Using this link structure, a logarithmic number of records can be traversed to move from a known (already verified) record to a different record to be verified.

The records 110 can include a record identifier, $id_t$, payload data, $D_t$, a list of backwards links, $B_t$, and a list of forward links, $F_t$ (e.g., $B_t^l = (id_t, D_t, B_t, F_t)$). The lists of backward links $B_t$ and forward links $F_t$ for a given record can store exactly a quantity of links that is equal to the height value l assigned to the given record (i.e. a given record can have l forward links and l backwards links). A reference at index i, where the index i is greater than zero and less than the height value l minus one ($0 \leq i \leq l-1$) in the list of backwards links $B_t$ points to the last record in a timeline of the data structure $S_{h,b}$ that has at least a height value l that is equal to the index i plus one ($l=i+1$) and in the list of forward links $F_t$ points to the next record in the timeline of the data structure $S_{h,b}$ that has at least a height l that is equal to the index i plus one ($l=i+1$). For embodiments in which the data structure is implemented as deterministic data structure, the last record to which the links in the list of backwards links point can be denoted as $B_{t-j}$ and the next record to which the links in the list of forward links point can be denoted as $B_{t+j}$, where $j=b^i$, and $b^i$ denotes the step-size for each height value l, e.g., a number of hops a backwards and/or forward link has at each height level (for $B_{t+j}$, where $b^i=1$, a link is a single hop, where $b^i=4$, a link points to a record that is four hops away from the current record in the timeline).

The assigned height value l for the data structure $S_{h,b}$ is determined based on the data structure type. As one non-limiting example, if the data structure 100 is implemented as a randomized data structure, then a pseudorandom binary output is repeatedly generated, where there is a probability b that the binary output will equal a specified binary value (e.g., a virtual coin with probability b to land on heads, is flipped for each record added to the data structure to assign a height value to each record). When pseudorandom binary output does not equal the specified binary value (e.g., a virtual coin flip results in tails), the assigned height value l is set to a minimum corresponding to either a quantity of times the pseudorandom output was the specified binary output before the a binary output other than the specified binary output was output or a maximum possible height value h for the data structure 100 (e.g., $l=\min(m,h)$, where m denotes, e.g., the number of times heads tossed until a tails is tossed). As another non-limiting example, if the data structure 100 is implemented as a deterministic data structure, the assigned height value l is set to $f_{t,b,h}$ (e.g., $l_t = f_{t,b,h}$, which is limited by the maximum possible height) with $f_{t,b,h}=1$, $h=1$;
$f_{t,b,h}=f_{t,b,h-1}$ if $h>1$ and $0 != t \mod b^{\{h-1\}}$; or
$f_{t,b,h}=f_{t,b,h}+1$ otherwise When a quantity of records in the sequence of records is small, e.g., only has a few records, the number of hops in a backward link can be limited such that the number of hops in a backwards link cannot exceed the number of preceding records in the sequence. As one example, multi-hop backwards links that would exceed the number of preceding records are not specified for a record when the record is created. As another example, a multi-hop backwards link that would exceed the number of preceding records can be truncated to point to a genesis record.

In some embodiments, as the number of records in the sequence of records increases, the maximum possible height that can be assigned to a record can increase. An increase in the maximum possible height can increase a maximum length of a link (i.e. a maximum number of hops in a multi-hop link). The value of the maximum possible height can effect a duration that a specific head of trust would have to exist such setting the maximum possible height that can be assigned to a record can be a trade-off between a maximum quantity of hops in a link and a desired duration for which a specific head of trust has to exist.

In some embodiments, the height-calculation can be restarted periodically (e.g., once per month, year, decade, etc.) such that a super-genesis-record is created periodically in the sequence of records (e.g., at the beginning of every year), and backwards and forward links can be added to these super-genesis-records to allow users to skip from year to year. The data structure 100 and the super-genesis-records can be specified so that no links (backwards or forwards) cross a super-genesis-record. As a non-limiting example, a sequence of records can correspond to a timeline of transactions occurring over a ten year period. If a user has a reference record that was created recently and wants to verify the authenticity of another users reference record, where the reference records have a common record in the sequence that was created seven years ago, the user would verify the authenticity of each super-genesis-record back to the year when the common record was created without having to verify the authenticity of any of the records that were created during the intervening years and subsequently only having to verify a subset of records between the super-genesis record and the common record (e.g., the minimum possible number of records that the links structure of the data structure 100 supports). As such, the user would need to verify the authenticity of a logarithmic number of records between the reference record and the common record based on the link structure of the data structure 100. A non-limiting example of a super-genesis record can be illustrated as record 115 in the data structure 100.

During the creation of a record in the data structure $S_{h,b}$, the record's identifier id is set to the (cryptographic) hash of the payload data, $D_t$ and the list of backwards links, $B_t$, both of which are known at the time the record is created, i.e., $id_t = H(D_t, B_t)$. The cryptographic hash can be generated using one or more cryptographic hashing functions, such as one of the hashing algorithms from the Secure Hashing Algorithm families (e.g., SHA-0, SHA-1, SHA-2, SHA-3, SHA-224, SHA-256, SHA-384, SHA-512, SHA-512/224, SHA-512/256, etc.), For a backward link from $Record_t$ to $Record_{t-j}$, the record identifier $id_{t-j}$ is stored at index i in the list of backwards links $B_t$, where the backwards links can be multi-hop links that point to previously records that are further back in the timeline than the immediately previous/last record added before the newly created record is added.

Forward links, however, result in two challenges. First, forward links have to be added retroactively to previously created records in the data structure $S_{h,b}$, as future records do not yet exist at the time of a given record is created. Second, for the creation of forward links, cryptographic hashes as used in the case of backward links are unavailable for forward links, as this would result in a circular dependency between the forward link of the current and the backward link of the next record. To solve the problems associated with adding forward links to records in the data structure $S_{h,b}$, digital (multi or collective) signatures are used. For example, for a forward link from $Record_t$ to $Record_{t+j}$, a cryptographic signature of the record identifier $id_{t+j}$ for the $Record_{t+j}$ ($sig_{E_t}(id_{t+j})$) can be stored at index i in the list of forward links $F_t$, where $E_t$ denotes the entity (possibly a decentralized collective such as a BFT-CoSi collective authority or cothority) that represents the head of trust of the decentralized peer-to-peer network at the time the record is created (e.g., during time step t). Each member that forms the entity $E_t$ can generate a private key and a public key. A member of the entity can sign the record identifier $id_{t+j}$ using their private key. Each digital signature from each member of the entity $E_t$ can be combined to generated the digital collective signature of the entity $E_t$. The public key from each member can be combined to create a collective public key to be associated with the digital collective signature. The collective public key can be stored in the $Record_t$ and/or in a separate record associated with the $Record_t$ (e.g., a Key Record), and the collective key can be used to authenticate the link between the $Record_t$ and the $Record_{t+j}$. In exemplary embodiments, Schnorr multisignatures can be used to combine the digital signatures from the members that form the entity into a single collective signature for the entity.

The entity $E_t$ must remain active (e.g., "stay alive") and monitor the head of the data structure 100 (i.e., each subsequent record added to the data structure $S_{h,b}$) to create the required signatures for the forward links until all slots in the list of forward links $F_t$ are specified. Once the forward links for the record are specified by the entity $E_t$, the job of entity $E_t$ is complete and can cease to exist. New entities can be dynamically created over time and can be charged with creating the required signatures for forward links in records. For example, an entity to serve as the head of trust can be formed for each time step or a number of time steps and can be charged with generated the required signatures for the forward links of the records that are generated during the time step or steps. The collective public keys of each entity can be associated with the respective records for which they exist. For example, records associated with an entity can include the collective public key associated with the entity and/or a separate key record can be generated and associated with the records. The separate key record can store the collective public key of the entity. The separate key records can form a parallel timeline within the data structure $S_{h,b}$ such that each record in the data structure $S_{h,b}$ includes a corresponding key record, which can be used to obtain the appropriate collective public keys.

As one non-limiting example, one or more separate data structures can be formed in the same manner as the data structure 100 such that the one or more separate data structures can include a sequence of records that hold the sets of entities responsible for the records in the data structure 100 over time (e.g., at time steps equal to the time step at which the records are created) so that the sequence of records in the one or more separate data structures can be used to determine the entity that exists when a particular record is created in the data structure 100. To verify the particular record in the data structure 100, the public keys of the members of entity or the collective key of the entity corresponding to the particular record can be retrieved from the one or more separate data structures, and used to verify the particular record.

Because each record includes a record identifier and the backwards and forward links of a record reference a record identifier of the record to which the links refer, the various levels and multi-hop links provided by the data structure can provide an efficient and effective structure for traversal of the data structure 100 from a reference record to another record created a long time before or after the reference record. This can be beneficial when two users each have a different reference record in the data structure 100 and each wants to verify the authenticity of the other's record. The users can find a common record to facilitate authentication of each other's record. For each user, to traverse the data structure 100 from their reference record to a common record, the users can utilize the multi-hop link structure of the data structure 100 to avoid having to authenticate each record between the reference record and the common record, which can be prohibitive or impractical, particularly when the users' device are resource constrained (e.g., thin clients). The users can traverse the data structure 100 moving between the levels (i.e. utilize the different length links between records) based on the record identifiers referenced in the links to identify and authenticate the common record using a logarithmic number of records between the reference record and the common record. For example, the user can start traversing the data structure at the highest level and can successive use lower levels as the user approaches the common record; thereby decreasing verification overhead using the multi-hop links.

As shown in FIG. 1, the series of records 110 in the data structure 100 generated or formed over period of time. The series of records 110 can be being with a genesis record and each record generated after the genesis record can be added to the series based on when a time at which the records are generated or formed. As an example, a record 111 can be added to the data structure 100 at a time t-4, a record 112 can be added to the data structure 100 at a time t-3, a record 113 can be added to the data structure at a time t-2, a record 114 can be added to the data structure 100 at a time t-1, and a record 115 can be added to the data structure 100 at a time t.

When each of the records 111-115 are created and added to the data structure 100, each record can be assigned a height value l according to the type of data structure 100 being implemented (e.g., randomized or deterministic). As an example, the record 111 can be assigned a height value equal to three (l=3), the record 112 can be assigned a height value equal to one (l=1), the record 113 can be assigned a height value equal to two (l=2), the record 114 can be assigned a height value equal to one (l=1), and the record 115 can be assigned a height value equal to three (l=3). The records 111 and 115, having a height of three, can each include slots for three forward links in their lists of forward links and three backwards links in their lists of backwards links. The records 112 and 114, having a height of one, can each include a slot for one forward link in their lists of forward links and one backwards link in their lists of backwards links. The record 113, having a height of two, can include slots for two forward links in its list of forward links and two backwards links in its list of backwards links.

The backwards links for each of the records 111-115 can be generated at the time the records 111-115 are created and can include a cryptographic hash of the payload data D and the list of backwards links B of the record to which the backwards links connect. This cryptographic hash becomes the record identifier for the newly generated record. As one example, the list of backwards links $B_{t-2}$ of the record 113 can include a cryptographic hash of the payload data $D_{t-3}$ and the list of backwards links $B_{t-3}$ of the record 112 for the slot in the list of backwards links $B_{t-2}$ corresponding to the assigned height value l of one and can include a cryptographic hash of the payload data $D_{t-4}$ and the list of backwards links $B_{t-4}$ of the record 111 for the slot in the list of backwards links $B_{t-2}$ corresponding to the assigned height value l of two. Each slot can also include the record identifier id associated with the records two which records is linked. As an example, the slot in the list of backwards links $B_{t-2}$ linking to the record 112 can include the record identifier $id_{t-3}$ for the record 112 and the slot in the list of backwards links $B_{t-2}$ linking to the record 111 can include the record identifier $id_{t-4}$ for the record 111.

The forward links for each of the records 111-115 can be generated at the time the future records to which the records 111-115 will be linked are generated. When the future records are created the list of forward links F can include a cryptographic digital collective signature of the entity that exists at the time each of the records 111-115 were created. As one example, the list of forward links $F_{t-2}$ of the record 113 can be retroactively updated, by the entity $E_{t-2}$ that exists when the record 113 is created, with a cryptographic digital collective signature of record identifier $id_{t-1}$ for the forward link to the record 114 once the record 114 is created and can be retroactively updated, by the entity $E_{t-2}$ that exists when the record 113 is created, with a cryptographic digital collective signature of record identifier $id_t$ for the forward link to the record 115 once the record 115 is created. For a forward link in the list of forward links, each device that forms the entity can include a private key and can create a cryptographic signature of the record identifier corresponding to the target record of the forward link. The individual cryptographic signatures can be combined into a single collective signature. A public key can be associated with the single collective signature and can be added to the record. The public key can be used to authenticate the forward link between the record and the target record.

As described herein, as the number of transactions recorded in a blockchain increase over time, the size of the blockchain and the computing resources including memory and processor resources required to monitor and verify transactions on the blockchain also increase. Because it can be necessary to download each block in the blockchain and verify the chain block-by-block, it can be difficult for resource constrained devices to efficiently and effectively interact with a blockchain over time. While such resource constrained devices may cede or defer trust to a full-node, deferring trust to a full node to perform the verification results in a loss of the benefit of decentralized security. Attempts to reduce the burden of computing resources to monitor and/or verify transactions in conventional blockchain-based systems using Simplified Payment Verification (SPV) still impose a substantial bandwidth/power cost (particularly to light/thin client applications) because the verifying device may still have to download headers of new blocks periodically or in bulk. Thus, the computing resources required increase linearly over time without bound. When using SPV, a client does not have a way to verify that it is actually seeing the same proof-of-work blockchain that the rest of the world is seeing. As a result, a sufficiently well-motivated attacker could invest the time required to create an alternate history with the amount of work needed to trick an SPV client.

Embodiments of the data structure 100 can advantageously enable devices (e.g., nodes, clients) to securely traverse arbitrarily long timelines both forward and backward from any reference record in the timeline. For example, if a device has the correct hash of an existing record, and wants to obtain a future or past record (e.g., a target record) in the timeline (i.e. record that was added before or after the reference record) from an untrusted source, according to embodiments of the present disclosure the device can download a logarithmic number of additional, intermediate records to cryptographically validate the target record (and all links leading to it), rather than downloading each record between the reference record and the future or past record of interest. As a result, the computing resources of the device are utilized more efficiently than for conventional blockchain-based data structure because embodiments of the present data structure generally require less memory, computational complexity, and processor time of the device to validate a target record starting from a known (trusted) record.

As another exemplary advantage of embodiments of the data structure $S_{h,b}$, suppose two clients have two different reference points on the timeline (i.e. a has a reference point to a different record in the data structure), but have no access to a copy of the full data structure: Provided the clients have cached a logarithmic number of additional records from the data structure along with their respective reference records—namely the reference records' next and prior records at each level in the assigned height—then the two clients have all the information they need to cryptographically validate each others' reference records. This property can, for example, be useful to resource-constrained clients that wish to validate records before entering into a transaction. As one example, the clients can be thin clients with limited computing resources that depends heavily on another computer (e.g., a server) to store data and/or perform computationally intensive processes. For example, if the data rate at which the client can download data make it prohibitive or impractical to download a large number of records, if the memory size makes it prohibitive or impractical for the client to store large numbers of records, and/or of the processor power or battery life make it probative to validate a large number of records.

Figure 2:
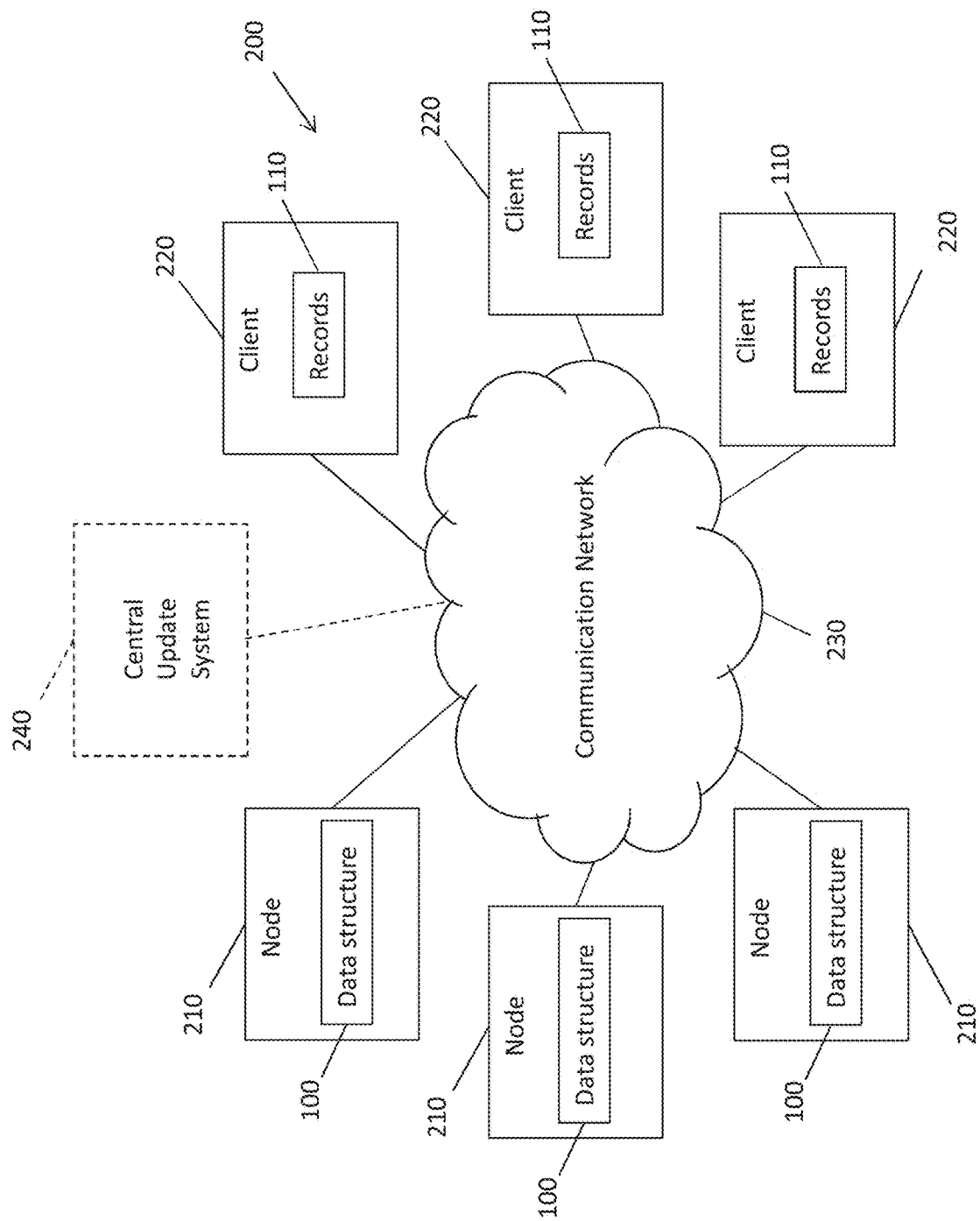
FIG. 2 is a block diagram of a decentralized peer-to-peer network of nodes configured to implement and/or utilize distributed cryptographically verifiable data structures having multi-hop forward and backwards links in accordance embodiments of the present disclosure.

FIG. 2 is a block diagram of a decentralized peer-to-peer data storage and retrieval system 200 for maintaining, updating, monitoring, and verifying transactions in an embodiment of the cryptographically verifiable data structure 100 having multi-hop forward and backwards links between the records 110. The distributed environment can include nodes 210 and clients 220 that can be selectively in communication with each other via a communication network 230. The nodes 210 and clients 220 can be computing devices that execute an engine for maintaining, updating, monitoring, and/or verifying records in a the cryptographically verifiable data structure having multi-hop forward and backwards links, as described herein. In exemplary embodiments, one or more of the clients 220 can be thin clients.

The nodes 210 can update the data structure 100 stored in their respective memory based on communications with other ones of the nodes 210 in the peer-to-peer environment. For example, when a node authenticates a new record to be added to the data structure, the node 210 can broadcast the new record and a proof-of-work associated with the authenticated new record. The other nodes can validate the new record and associated proof-of-work to form a consensus regarding the validity of the new record before adding the record their respective data structures. When the new record is created by one of the nodes 210, the node 210 can assign a height value l to the new record and can include a record identifier, $id_r$, payload data, $D_r$, a list of backwards links, $B_r$, and empty slots for future generation of a list of forward links, F. In some embodiments, the nodes 210 participating in the record generation or consensus at the time the new record is created can form the entity E. As additional records are added to the distributed data structure, the entity can monitor the head of the data structure. When a target record is added corresponding to a forward link from a record that was added when the entity was formed, the entity can generate a collective cryptographic signature that includes the record identifier of the target records, and the collective cryptographic signature can be retroactively added to the record.

The clients 220 can interact with the nodes 210 or other clients 220 to obtain records in the data structure to monitor and/or verify records (e.g., before entering into a transaction with another client). The clients can be lightweight computers having a limited memory, processing power, and/or power source, and that depends heavily on remote computing system (e.g., a server) to store data and/or perform computationally intensive processes. As an example operation of the clients 220, if a client has the correct hash of an existing record in the distributed data structure, and wants to obtain a future or past record in the data structure from an untrusted source, the client can download a logarithmic number of additional, intermediate records from the one or more of the nodes 210 or clients 220 to cryptographically validate the record from the untrusted source (and all links leading to the record). As another example, if two of the clients 220 wish to enter into an exchange (e.g., a transaction), each of the clients 220 can verify the other client has in its possession the object of the exchange. Each client can download or have cached a logarithmic number of records from the data structure along with a reference record, and each of the clients 220 can cryptographically validate each others' reference records. For illustrative purposes the function of the clients with respect to FIG. 2 is for the clients to monitor and validate records that have already been added to the distributed data structure by downloading and/or caching a logarithmic number of the records in the data structure and the function of the nodes are to monitor and update the data structure with new records at the new records are generated and authenticated. However, in exemplary embodiments, nodes can be clients and clients can be nodes in the peer-to-peer decentralized environment.

The communications network 230 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Still referring to FIG. 2, as a non-limiting example, embodiments of the system 200 and data structure 100 can be implemented for the distribution and verification of software updates in a decentralized peer-to-peer environment. Software updates play an important role in minimizing the impact of exploits and other bugs. Fast distribution and verifiable updates that address faulty components can aid in securing information technology systems. In order to trust a software update distributed via a network, a system generally attempts to verify the authenticity of the software update. Conventionally, the update-file for the software update is signed using a key, where the public part is hardcoded into the update-file, and the private part is only available to the software-developers. One disadvantage of using this architecture is that an attacker can find the private key and launch a man-in-the-middle attack on the system, which can result in a malicious (backdoored) version of the software update being installed on the system.

Signing software updates using multiple keys at the same time can aid in preventing an attacker from creating a backdoored update if only a subset of the keys is compromised. Upon determining that a key has been compromised, the compromised key is revoked and replaced with a new key. All devices need to know the new key. In addition, since it is not certain that key compromise will be detected at all, standard security best practices call for keys to be replaced regularly even when no compromise has been detected. For embodiments in which the system 200 and data structure 100 are implemented for software updates, a central update system 240 can be implemented as a central update authority that includes one or more update servers. The devices can learn the new key by polling a central authority about any key changes. However, if a device is offline for a period of time, the device will have to follow all changes in the keys before being able to know the latest set of keys that is actually used. During the time the device is offline, the device has no way of learning the new keys, and once it comes back online after a long offline period it may have to cope with a long series of key changes resulting either from compromise or regular key rotation.

Exemplary embodiments can address the problem associated with key changes by using the entities E as trust-delegations from one keyset to a next keyset, where each entity associated with a keyset not only delegates trust to the next, but also, in time, delegates trust to entities associated with later keysets. Using the data structure 100 shown in FIG. 1 as an example, the record 111 can be a key record that holds the oldest keyset associated with software updates and can have a forward link to record 115, which can be a key record that holds the latest keyset. In addition to holding keysets, the key records can also contain data about valid updates. As each key record can be signed by the entity, and a device can verify the validity of a key record (and the keyset it represents) and the key record's forward-links without relying on an online connection to allow two offline devices to securely exchange data to find the latest known keyset between the two offline devices, get a list of valid updates, and fetch the latest security parameters. For example, each of the two offline devices (e.g., clients 220) can store a subset of the key records in the data structure 100 from the last time the two device were online (e.g., the last time the two device polled the central authority). The devices can store a logarithmic number of key records in memory to authenticate each others' records to identify and verify the latest keyset. For example, if the two offline device have two different reference points in the data structure (e.g., each has a reference to a different key record), and have no access to the full data structure, provided the two offline devices have cached a logarithmic number of additional key records in the data structure along with their respective reference key records—namely the next and prior key records linked to the reference key record at each level—then the two offline device can have all the information needed to cryptographically validate each others' reference key records.

This approach to key changes advantageously provides for secure update in case one or more of the keys change and lower complexity over conventional approaches if one device has a very old key record because embodiments of the data structure 100 do not require an offline device to verify all intermediate key records between a known key record and the latest key record, rather the offline device only needs to verify the key records linked to the known record. The ability to cryptographically validate key records offline and without access to the full data structure using only a logarithmic number of key records can be useful, for example, to resource-constrained devices exchanging software updates in a peer-to-peer environment while disconnected from any central software update server. For software updates, "forward validation" can be important, where an out-of-date client obtains a newer update from a peer, and reverse validation (via hashes) can be important for secure version rollback.

Still referring to FIG. 2, as a non-limiting example, embodiments of the system 200 and data structure 100 can be implemented for peer-to-peer micropayments and smart contracts. There are conventionally several drawbacks when implementing micropayment systems. While many blockchain-based platforms are being explored, such platforms typically suffer from high latency (around 1 hour) before accepting the payment, low throughput (about seven transactions per second). Furthermore, offline verification and payment between to offline devices (e.g., device that are not connected to the platform) via these conventional blockchain-based platforms is typically impractical or prohibitive due to the structure of the blockchains utilized by these platforms. This is particularly true for resource constrained devices that wish to verify and enter into a transaction offline (e.g., mobile device with limited battery life, memory size, and processing power).

In one non-limiting example, if a customer (e.g., one of the clients 220) wants to utilize micro-payments, the customer starts with a smart-contract, where the customer makes a down-payment as a guarantee that customer will pay up to a certain amount for micro-payments at time x. One of the nodes 210 or other clients 220 can return a proof for the smart-contract that can be verified by sellers (e.g., other ones of the clients 220) without having to access the internet or, if they have internet access, with minimal time needed to verify the smart contract. In some embodiments, a node or nodes 210 giving the proof of the down-payment can have follow the transactions and maintain a sequence of records associated with the transactions. If the node or nodes 210 that give the proof, fail to follow the transactions associated with the smart contract, an indication of the failure can be associated with the node or nodes 210 to alert future clients 220 (e.g., buyers and/or sellers) of the previous failure, e.g., so that the future clients do not use the node or nodes 210 for down-payments.

In the event that the customer wants to pay sellers (e.g., buy items from sellers), the customer (e.g., via the client device) presents his proof of down-payment and a signature on the amount of the micro-payment to each of the sellers. The sellers (e.g., via the other client devices) needs only to know (or trust) an earlier record in time in the data structure 100, then the sellers can verify the proof to be true and verify the signature is legitimate.

Once the time x arrives, each seller (via the other client device) that entered into a transaction with the customer sends a request to the nodes 210 to receive the money from the down-payment by the customer. If the down-payment exceeds the requests for micro-payments, the customer retains the remaining currency. If the micro-payments exceed the down-payment, the customer overspent, and the sellers share the down-payment. The sharing of an overspent down-payment can be determined either as a proportion of the money spent by the customer at each seller, or in the order with which the customer enter into the transactions with the sellers. In some embodiments, verifiers can be added that sign a down-payment after checking that the customer has never over-spent the down-payment. The verifiers can guarantee the overspent micro-payments and can receive a fee that is deducted from the down-payment if the smart-contract is successfully fulfilled.

A seller can decide whether he wants to accept only smart-contracts signed by verifiers, or whether the seller will also accept bare smart-contracts. The seller can decide whether to require verifiers based on one or more factors, such as the amount of payment and the size of the down-payment. If the amount to be paid corresponds to a large percentage of the down-payment, the seller may be inclined to only accept a smart-contract signed by verifiers. If the amount of the payment is a small percentage of the down-payment, the seller may be inclined to accept a smart-contract that has not been signed by verifiers. A seller can consider the time of the smart contract and the time of the payment, in case overspent down-payments get paid based on the order in which transactions are entered by the customer based on the underlying smart contract. In some embodiments, in order to guarantee correct timing, a time-stamp server can be used.

As another non-limiting example, still referring to FIG. 2, embodiments of the system 200 and data structure 100 can be implemented for peer-to-peer verification of electronic documents representing personal/professional credentials, quality control certificate, and/or inspection certificates. For example, when a prospective employer/inspector/owner (a first user) requests a job applicant or contractor (a first user) to prove that the applicant/contractor has the credentials/certificates he/she has indicated, the applicant/contractor can prove the authenticity of the credentials/certificates to the employer/inspector/owner in a low-cost fashion, peer-to-peer if necessary without need for Internet access (e.g., even if they are in a small village somewhere in a remote village in a developing country, or if the building to be serviced has no electricity/internet/etc. at the moment because that's what the electrician is coming to fix). In one embodiment, a QR code or other machine-readable element can be printed on or affixed to the physical credentials/certificates. The machine-readable element can be scanned and cryptographically verifiable immediately, even offline, by a verifying user using a known (already verified) record in the data structure 100 and authenticating a logarithmic number of downloaded records between the known record and the record to be verified.

Figure 3:
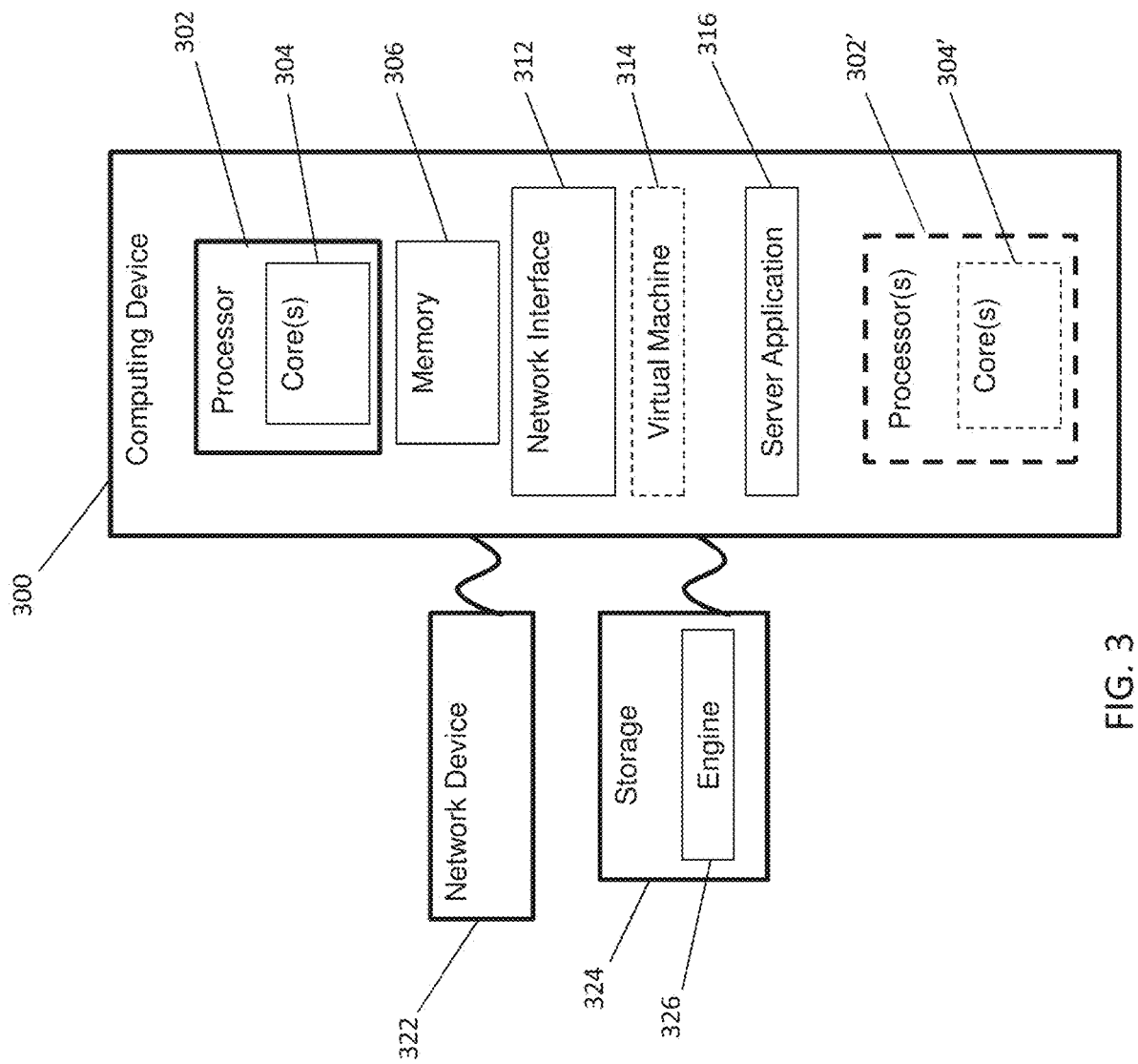
FIG. 3 is a block diagram of an exemplary computing device that can be utilized as a node in a distributed environment for maintaining a distributed data structure, or portions thereof, in accordance with exemplary embodiments of the present disclosure.

FIG. 3 is a block diagram of an exemplary computing device that can be utilized as a node in a distributed environment for maintaining a distributed data structure, or portions thereof, in accordance with exemplary embodiments of the present disclosure. In the present embodiment, the computing device 300 is configured as a server that is programmed and/or configured to execute one of more of the operations and/or functions maintain, monitor, update, and verify distributed data structures, and to facilitate communication with other computing device. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 306 included in the computing device 300 may store computer-readable and computer-executable instructions or software for implementing exemplary embodiments of an engine 326 configured to maintain, update, monitor, and/or verify records in a cryptographically verifiable data structure having multi-hop forward and back-wards links. The computing device 300 also includes configurable and/or programmable processor 302 and associated core 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor (s) 302' may each be a single core processor or multiple core (304 and 304') processor.

Virtualization may be employed in the computing device 300 so that infrastructure and resources in the computing device may be shared dynamically. A virtual machine 314 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

The computing device 300 may also include one or more storage devices 324, such as a hard-drive, CD-ROM, mass storage flash drive, or other computer readable media, for storing data and computer-readable instructions and/or software that can be executed by the processing device 302 to implement exemplary embodiments of the engine 326.

The computing device 300 can include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein. While the computing device 300 depicted in FIG. 3 is implemented as a server, exemplary embodiments of the computing device 300 can be any computer system, such as a workstation, desktop computer or other form of computing or telecommunications device that is capable of communication with other devices either by wireless communication or wired communication and that has sufficient processor power and memory capacity to perform the operations described herein.

The computing device 300 may run any server application 316 (or operating system), such as any of the versions of server applications including any Unix-based server applications, Linux-based server application, any proprietary server applications, or any other server applications capable of running on the computing device 300 and performing the operations described herein. An example of a server application that can run on the computing device includes the Apache server application.

Figure 4:
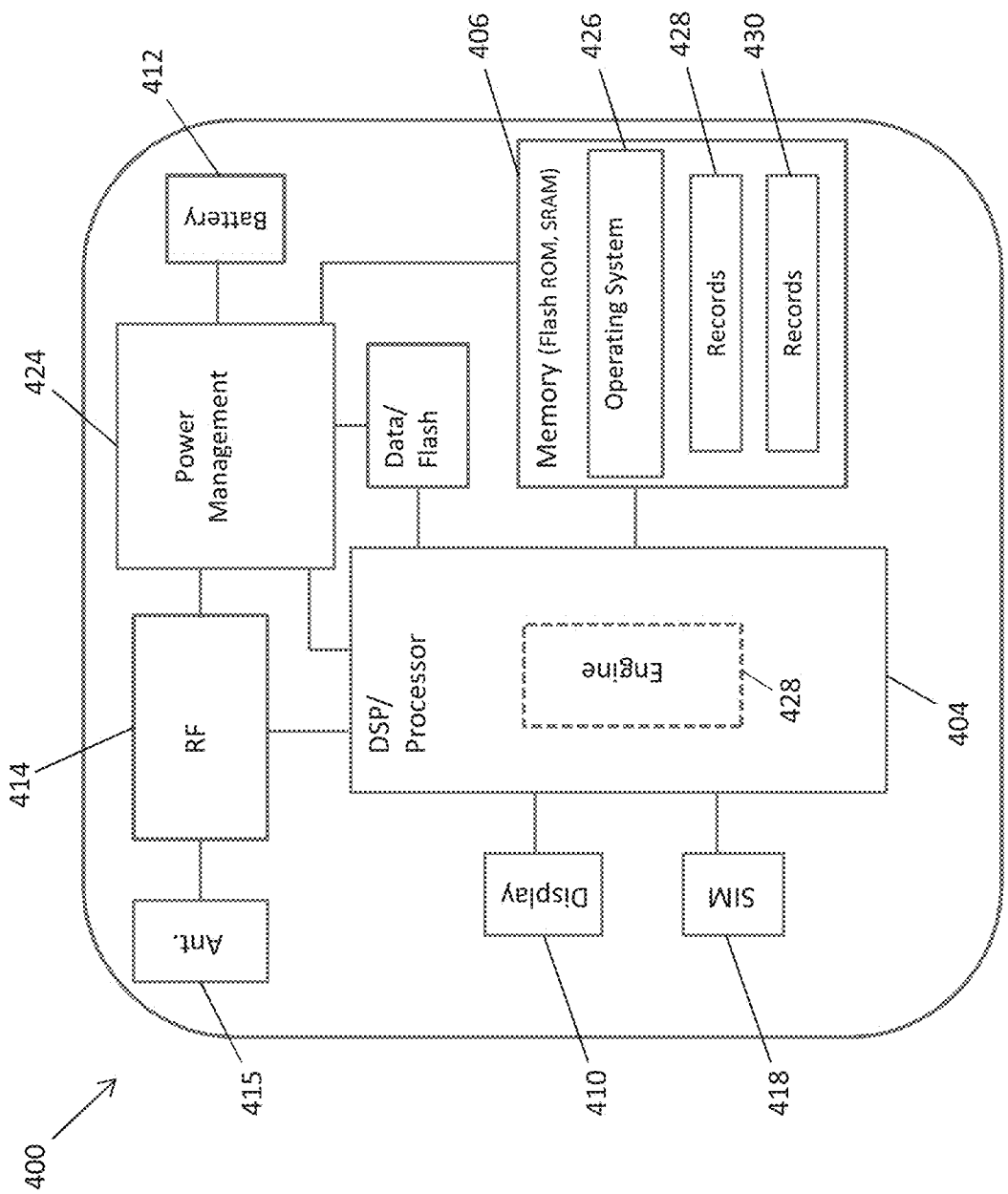
FIG. 4 is a block diagram of a portable computing device that can be utilized to interact to monitor and verify transactions in a distributed data structure in accordance with embodiments of the present disclosure.

FIG. 4 is a block diagram of an example resource constrained portable computing device 400 that can be utilized to monitor and verify transactions in a distributed data structure in accordance with embodiments of the present disclosure. The portable computing device 400 can be a smartphone, tablet, subnotebook, laptop, personal digital assistant (PDA), and/or any other suitable portable computing device that includes or can be programmed and/or configured to implement and/or interact with one or more nodes in a distributed environment to monitor and/or verify transactions in a distributed data structure. The portable computing device 400 can include a processing device 404, such as a digital signal processor (DSP) or microprocessor, memory/storage 406 in the form a non-transitory computer-readable medium, a display unit 410, a battery 412, and an radio frequency transceiver 414. Some embodiments of the portable computing device 400 can also include other components, such as subscriber identity module (SIM) card 418 and power management circuitry 424.

The memory 406 can include any suitable, non-transitory computer-readable storage medium, e.g., read-only memory (ROM), erasable programmable ROM (EPROM), electrically-erasable programmable ROM (EEPROM), flash memory, and the like. In exemplary embodiments, an operating system 426 and an engine 428 can be embodied as computer-readable/executable program code stored on the non-transitory computer-readable memory 406 and implemented using any suitable, high or low level computing language and/or platform, such as, e.g., Java, C, C++, C#, assembly code, machine readable language, and the like. The engine 428 configured to interact with one or more nodes in a distributed environment and to monitor and/or verify transaction in a distributed data structure maintained by the one or more nodes. The memory 406 can also store a (logarithmic) number of records 430 in the distributed data structure to be used by the engine 428 to monitor and/or verify records in the data structure. While memory is depicted as a single component those skilled in the art will recognize that the memory can be formed from multiple components and that separate non-volatile and volatile memory device can be used.

The processing device 404 can include any suitable single- or multiple-core microprocessor of any suitable architecture that is capable of implementing and/or facilitating an operation of the portable computing device 400. For example, to verify transaction in a distributed data structure, transmit/receive data associated with the distributed data structure (e.g., via the RF transceiver 414), display data/information associated with the distributed data structure, and the like. The processing device 404 can be programmed and/or configured to execute the operating system 426 and engine 428 to implement one or more processes to perform one or more operations. The processing device 404 can retrieve information/data from and store information/data to the memory 406. For example, the processing device can retrieve and/or store a subset of records in the distributed data structure, public key(s), private key(s), and/or any other suitable information/data that can be utilized by the portable computing device and/or the user to monitor and verify transaction in a distributed data structure.

The RF transceiver 414 can be configured to transmit and/or receive wireless transmissions via an antenna 415. For example, the RF transceiver 414 can be configured to transmit data/information, such as portions of a distributed data structure, public key(s), authentication of records, verification of transactions in the distributed data structure, and/or to receive data/information, such as portions of a distributed data structure, public key(s), authentication of records, verification of transactions in the distributed data structure, from one or more servers or clients. The RF transceiver 414 can be configured to transmit and/or receive information at a defined data rate, a specified frequency, and/or according to a specified sequence and/or packet arrangement.

The display unit 410 can render user interfaces, such as graphical user interfaces to a user and in some embodiments can provide a mechanism that allows the user to interact with the GUIs. For example, a user may interact with the portable computing device 400 through display unit 410, which may be implemented as a liquid crystal touch-screen (or haptic) display, a light emitting diode touch-screen display, and/or any other suitable display device, which may display one or more user interfaces that may be provided in accordance with exemplary embodiments.

The power source 412 can be implemented as a battery or capacitive elements configured to store an electric charge and power the portable computing device. In exemplary embodiments, the power source 412 can be a rechargeable power source, such as a battery or one or more capacitive elements configured to be recharged via a connection to an external power supply.

Figure 5:
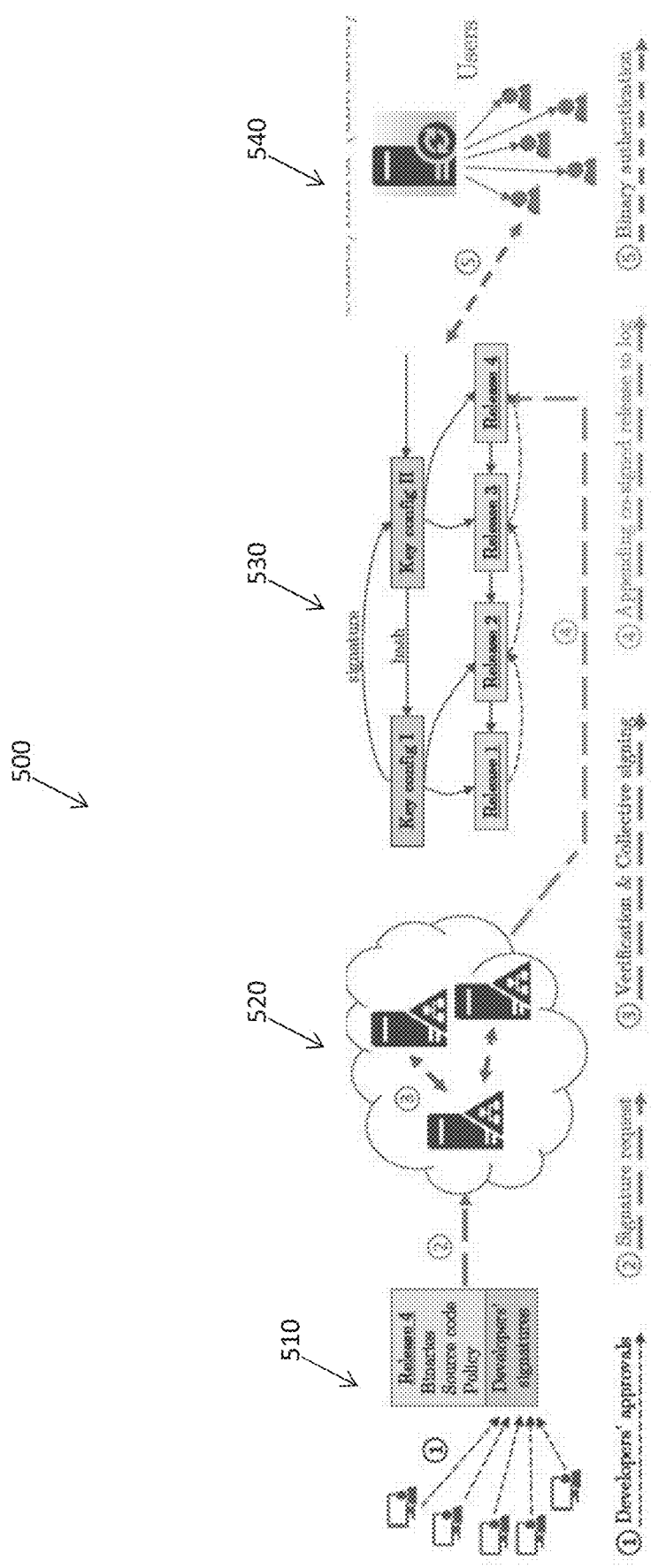
FIG. 5 depicts an exemplary embodiment of the software update environment in accordance with embodiments of the present disclosure.
Figure 6:
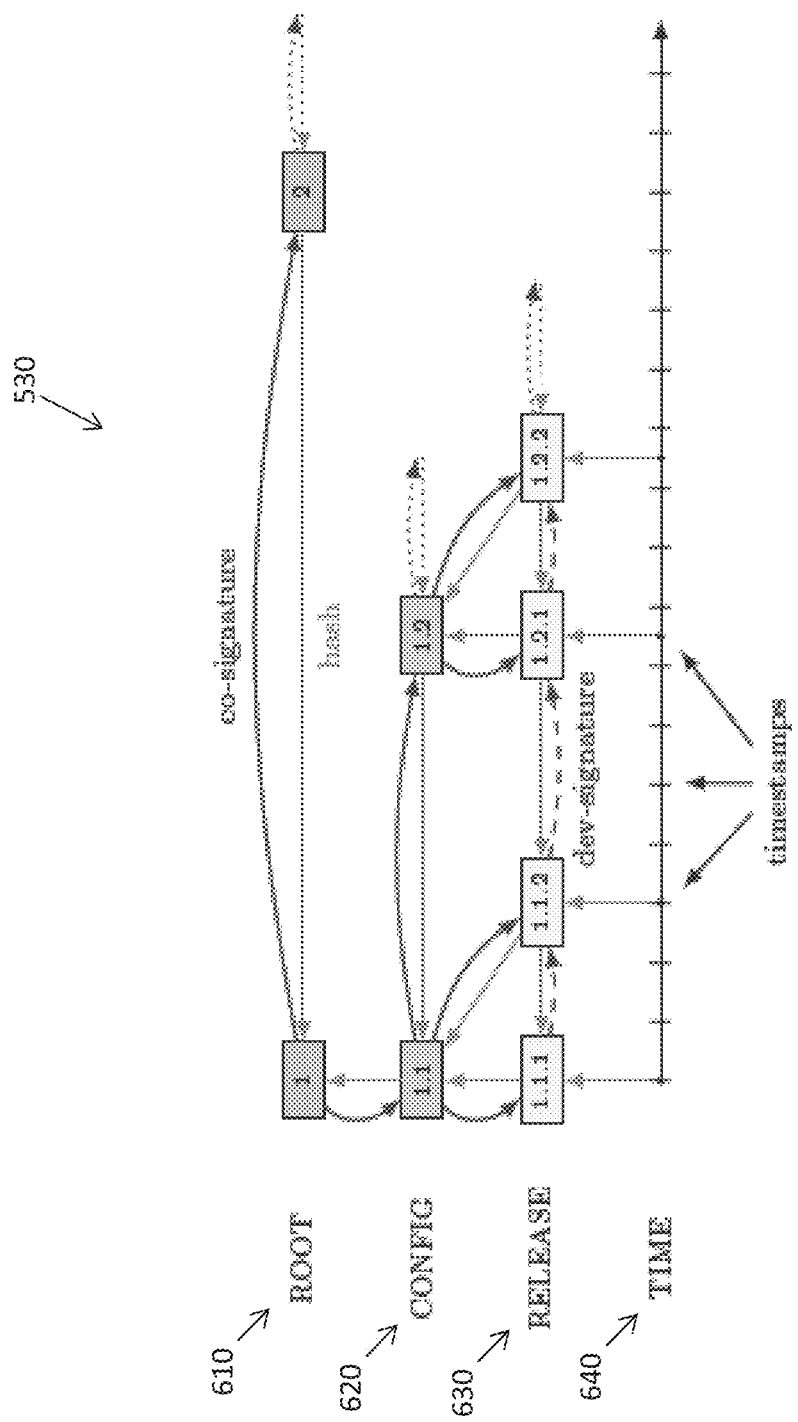
FIG. 6 depicts an example embodiment of a multi-layer data structure in accordance with embodiments of the present disclosure.
Figure 7:
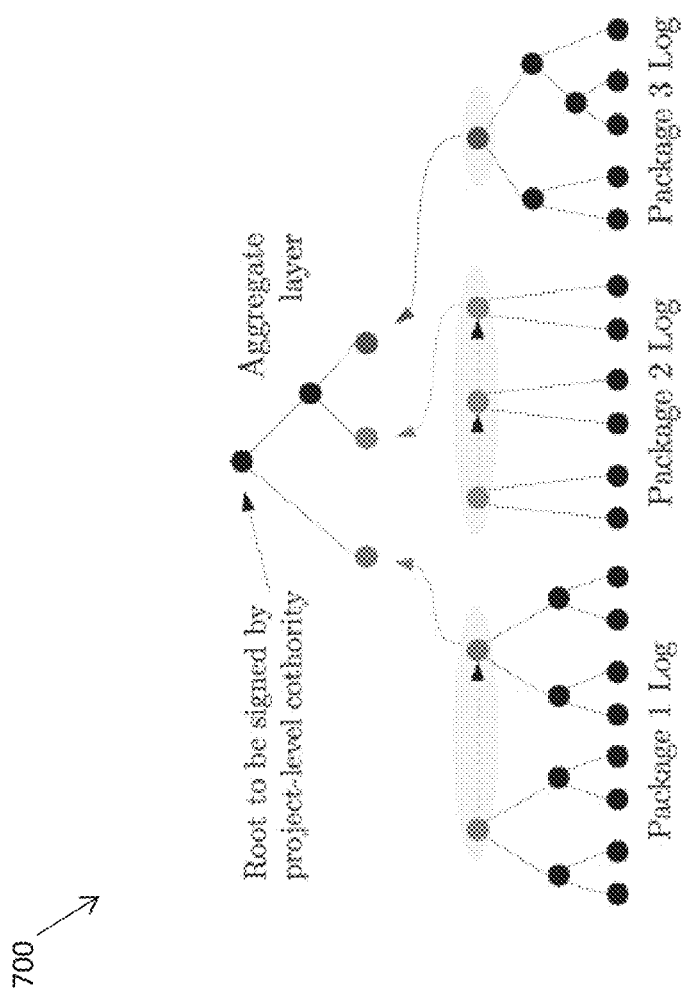
FIG. 7 depicts the generation of an aggregate layer in an embodiment of the multi-layer data structure in accordance with embodiments of the present disclosure.

FIGS. 5-7 describe a non-limiting experimental embodiment of the present disclosure as it relates to a software update environment in a data storage and retrieval system utilizing an embodiment of the data structure 100 shown in FIG. 1. The software update environment provides decentralized enforcement of development and release processes, independent verification of source-to-binary correspondence, transparency via a collectively-signed update timeline, and efficient release validation by arbitrarily out-of-date clients. The environment can include a scalable set of independent witness servers that verify adherence to developer review, sign-off, and release procedures, and independent build verifiers ensure precise source-to-binary correspondence. The software update environment enforces transparency and protects clients from targeted attacks by producing a collectively-signed release log, ensuring that no update is accepted by clients before being widely disclosed and validated. Embodiments of the data structure enable arbitrarily out-of-date clients to validate new updates and new update signing keys efficiently.

The software environment was evaluated on reproducible Debian packages using 24-core Intel Xeons at 2.5 GHz with 256 GB of RAM with up to 128 nodes on one server and the network-delay set between any two nodes to $100ms$. An average of update processing of five minutes per individual package and twenty seconds for the aggregate timeline was achieved. The software environment was also evaluated using real-world data from the PyPI package repository in a simulated environment including four collectively signing servers on a computer with a 3.1 GHz Intel Core i7 processor and 16 GB of RAM, without accounting any network latencies, as only CPU-time and bandwidth were measured. Based on these simulations, the environment offers clients security comparable to verifying every single update while only consuming only one-fifth of the bandwidth and having minimum computational overhead.

FIG. 5 depicts an exemplary embodiment of the software update environment 500. The environment 500 includes a developer network 510, an update collective authority (or cothority) system 520 (including a collection of servers), a multi-layer data structure 530, and an (untrusted) update center/mirror 540.

To protect against a single compromised developer, each developer in the developer network 510 has individual signing keys. A threshold of the developers are required to sign each release of a software update. To facilitate distribution of verified binary files to end users, developer-signed reproducible builds are used. Users verify multiple signatures, do not need to build the source code. In exemplary embodiments, at the beginning of a project, the developers collect their public keys in a policy file, as a trust anchor, together with a threshold value that specifies the minimal number of valid developer signatures required to make a release valid. The policy file can obtained securely by users at the initial acquisition of the software, e.g., it can reside on a project's website. To announce a new software release, the developers combine the hashes of the associated source code and binary files in a Merkle tree. Each developer checks the source code and signs the root hash of the tree to create a summary. The developers then send the release data and the list of their individual signatures to the cothority system 520.

The cothority system 520 validates software releases and collectively signs the software releases once validated. To validate a new software release, each cothority server in the cothority system 520 checks the developer signatures against the public keys and the threshold defined in the policy file. The policy associated with the software release is a challenge of the cothority system 520. The cothority system 520 then compile the source code and compares the result against the binary files for the release to facilitate transition from reproducible builds to verified builds. The verified builds allow clients to obtain the guarantee of source-to-binary correspondence without the need to accomplish the resource-consuming building work, due to the broad independent validation.

The data structure 530 is utilized for the software releases to provide a collectively signed decentralized cryptographically verifiable timeline of the software releases. The data structure 530 creates a public history of the releases for each software project. When a new release is announced, the developers include and sign the summary (Merkle Root) of the software's last version. The cothority then checks the developers' signatures, the collective signature on the parent record in the data structure and that there is no fork in the data structure. If everything is valid, the cothority system 520 builds the summary for the current release and creates a new collective signature.

Even if an attacker controls a threshold of developer keys for a package and creates a seemingly valid release, the only way to convince any client to accept the malicious update is to submit it to the cothority system 520 for approval and public logging, which is incapable of signing the compromised release; thereby preventing distribution of the malicious update.

The software update center/mirror 540 can store the software updates and can be accessed by users to download and install the software updates after the users authenticate the software updates via the data structure 530. Clients can download the software release from the software update center 540 and can validate the release by verifying only a single collective signature and Merkle inclusion proofs for the components of interest.

The keys used by the developers and cothority servers of the cothority system 520 can change over time. For the cothority keys, each cothority configuration can form a record in the data structure 530. When a new cothority configuration is introduced, the current cothority witnesses validate the new cothority configuration, and the configuration is added a new record to the data structure 530, along with the produced collective signature, as a forward link. For the developer keys, the trust is rooted in the policy file. To enable a rotation of developer keys, a policy file forms part of the Merkle tree of the release and is protected by the data structure 530. To update developer keys, developers can specify a new policy file that includes an updated set of keys, then, as usual during a new software release, the developers can sign the policy file with a threshold of their current keys, delegating trust from the old to the new policy. Once the cothority system 520 has appended the new software release to the data structure, the new keys become active and supersede their older counterparts.

FIG. 6 depicts an example embodiment of the multi-layer data structure 530. The layers of the multi-layer data structure 530 can have different trust roles, each having different responsibilities and rights. The data structure can include ROOT layer 610, CONFIG layer 620, RELEASE layer 630, and TIME layer 640. The ROOT layer, CONFIG layer 620, and RELEASE layer 630 are interconnected with each other through upward and downward links represented as cryptographic hashes and signatures, respectively using the same process for generating backwards and forward links, respectively.

The ROOT layer 610 represents the root of trust. The signing keys are the most security-critical and are kept offline. The signing keys are used to delegate trust to the update cothority and revoke trust in case of misbehavior. The ROOT layer 610 changes slowly (e.g., once per year), and old keys are deleted immediately. As a result, the ROOT layer 610 has a height of one with only single step forward and backward links.

The CONFIG layer 620 represents the online keys of the update cothority. These keys are kept online and attest to the validity of new release-records. The CONFIG layer 620 can have higher levels for links than the ROOT layer 610. If a threshold of CONFIG keys is compromised, a new set of CONFIG keys is signed via the ROOT layer 610. This is equivalent to a downward link from the ROOT layer 610 to the CONFIG layer 620.

The RELEASE layer 630 includes the release records and includes upward links to ROOT layer 610 and the CONFIG layer 630, enabling clients to efficiently look up the latest trusted ROOT and CONFIG configurations required for verifying software releases.

Finally, the TIME layer 640 provides a timestamp service that informs clients of the latest version of a package. Every TIME record contains a wall-clock timestamp and a hash of the latest release. The CONFIG leader creates this record when a new release record is co-signed or periodically. Before singing, independent servers check that the hash inside the timestamp is correct and that the time indicated is sufficiently close to their clocks (e.g., within five minutes). Clients can then detect freeze attacks, from an absence of fresh TIME updates, provided the client has an approximately accurate notion of the current time.

FIG. 7 depicts the generation of an aggregate layer 700 in an embodiment of the multi-layer data structure. To keep track of software packages, users often rely on large software projects, such as Debian or Ubuntu, and their community repositories. Each of these packages may be maintained by a separate group of developers, which can deploy its own release log. To stay updated with new releases of installed packages, a user have to frequently contact all the respective release logs and follow their configuration data structures (embodiments of data structure 100). This conventional approach is not only bandwidth- and time-consuming for the user but also requires the maintainers of each package to run a freshness service.

The aggregate layer 700 is responsible for collecting, validating and providing to clients information about all the packages included in the project. A project-level update cothority implements a project log where each entry is a snapshot of a project state. To publish a new snapshot, the cothority retrieves the latest data from the individual package data structures 530 shown in FIG. 5, including freshness proofs and signatures on the heads (the last record added to the data structure). The witness servers then verify the correctness and freshness of all packages in this snapshot against the corresponding per-package logs. Finally, the cothority system forms a Merkle tree describing all package versions in the snapshot, and collectively signs it. This architecture facilitates the gradual upgrade of large open-source projects, as packages that do not yet have their own data structure 530 can still be included in the aggregate layer, as hash values of the latest release files. The project level cothority can run an aggregate timestamp service, ensuring that clients are provided with the latest status of all individual packages and a consistent repository state. A client can request the latest signed project-snapshot from the update cothority and can check outdated packages on the client's system using Merkle proofs. If there are such packages, the client accesses their individual release logs, knowing the hash values of the latest records.

Figure 8:
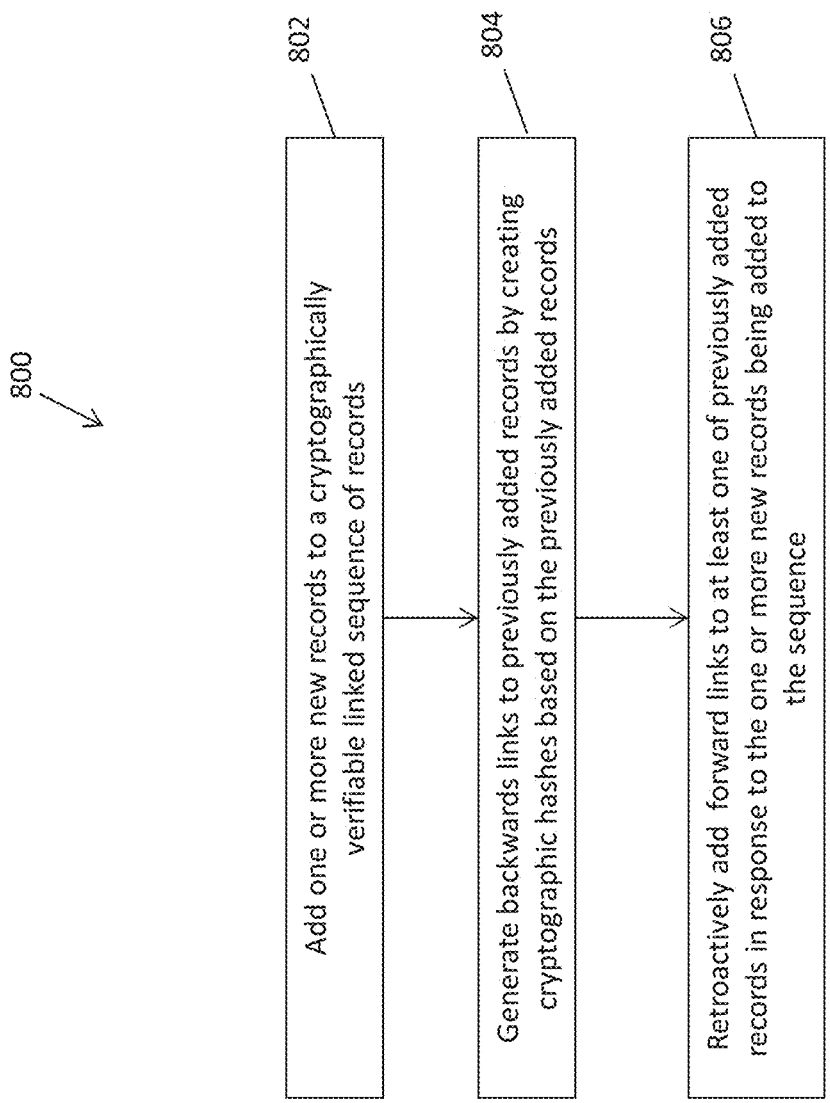
FIG. 8 is a flowchart illustrating a process of cryptographically storing information for retrieval and verification in a decentralized network.

FIG. 8 is a flowchart illustrating a process 800 of cryptographically storing information for retrieval and verification in a decentralized network. At step 802, one or more new records are added to a cryptographically verifiable linked sequence of records by one or more nodes in the decentralized network. Record identifiers for each of the one or more new records based on payload data included in the one or more new records and the backwards links. For example, a hash of the payload data and the backwards links for a new record is computed to determine the record identifier for the new records. At step 804, the one or more nodes generate, for the one or more new records added to the sequence, backwards links to previously added records by creating cryptographic hashes based on the previously added records. At step 806, forward links are retroactively added to at least one of previously added records in response to the one or more new records being added to the sequence. A forward link is generated by creating a cryptographic signature of a record identifier of a new record, and adding the cryptographic signatures to the at least one of the previously added records. The cryptographic signature can be a collective signature, which can be generated by creating individual cryptographic signatures from each member of a head of trust based on a private key associated with each member and combining the individuals signatures.

Figure 9:
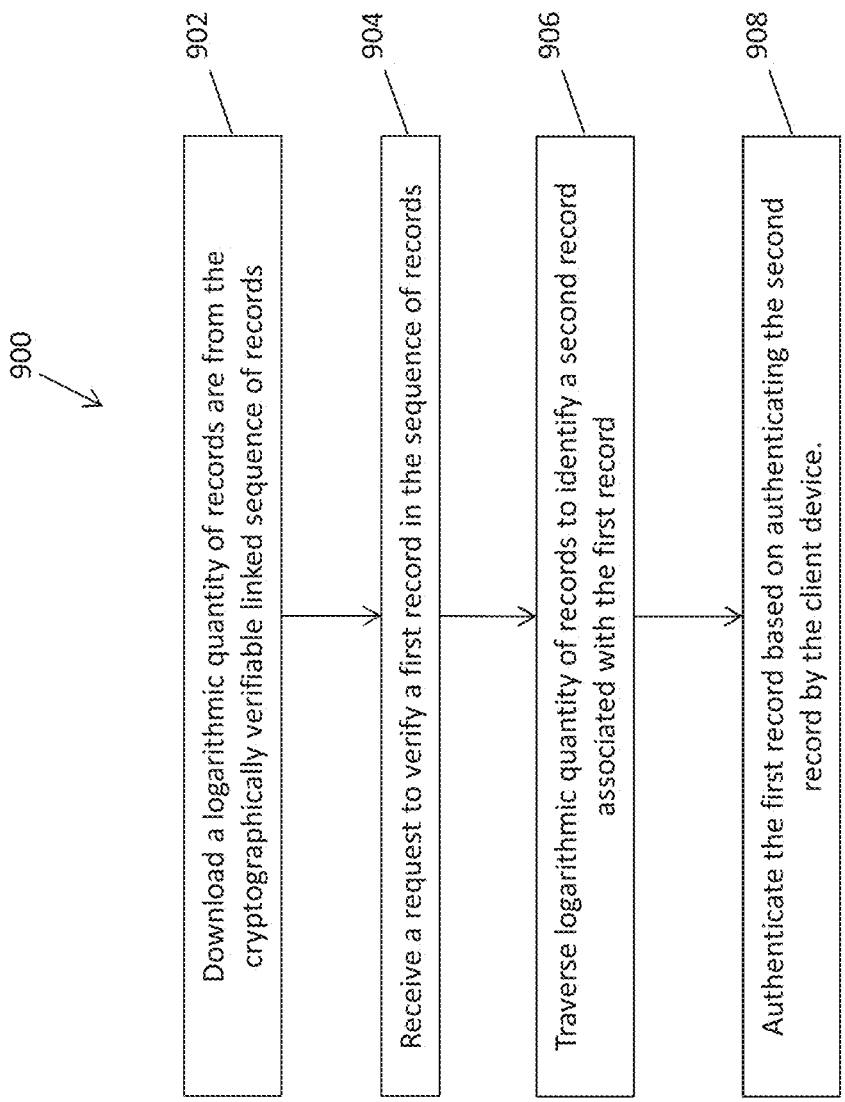
FIG. 9 is a flowchart illustrating an example process for verifying a reference record in a cryptographically verifiable linked sequence of records.

FIG. 9 is a flowchart illustrating an example process 900 for verifying a reference record in a cryptographically verifiable linked sequence of records. At step 902, a logarithmic quantity of records are downloaded from the cryptographically verifiable linked sequence of records by a client device. Each one of the records has an assigned height level that determines a quantity of backwards and/or forward links each one of the records includes and determines levels associated with the backwards and/or forwards links. At step 904, a request to verify a first record in the sequence of records is received by the client device. At step 906, the logarithmic quantity of records is traversed and authenticated (e.g., via proofs of work) by the client device according to the levels to identify a second record associated with the first record. At step 908, the first record is authenticated based on authenticating the second record by the client device.

The backwards links and forward links include multi-hop links and a quantity of records needed to verify a select record in the sequence is a logarithmic function of a total quantity of records in the sequence or the total number of records between a known (trusted) recorded and the record to be verified. Each of the previously added records and the one or more new records are assigned a height value that determines a quantity of backwards and/or forward links that are generated for each of the one or more new records and determines levels associated with the backwards and/or forward links, where the level determines a quantity of hops the backwards and/or forward links have. A quantity of records associated with each of the levels exponentially decreases as the levels increase.

Figure 10:
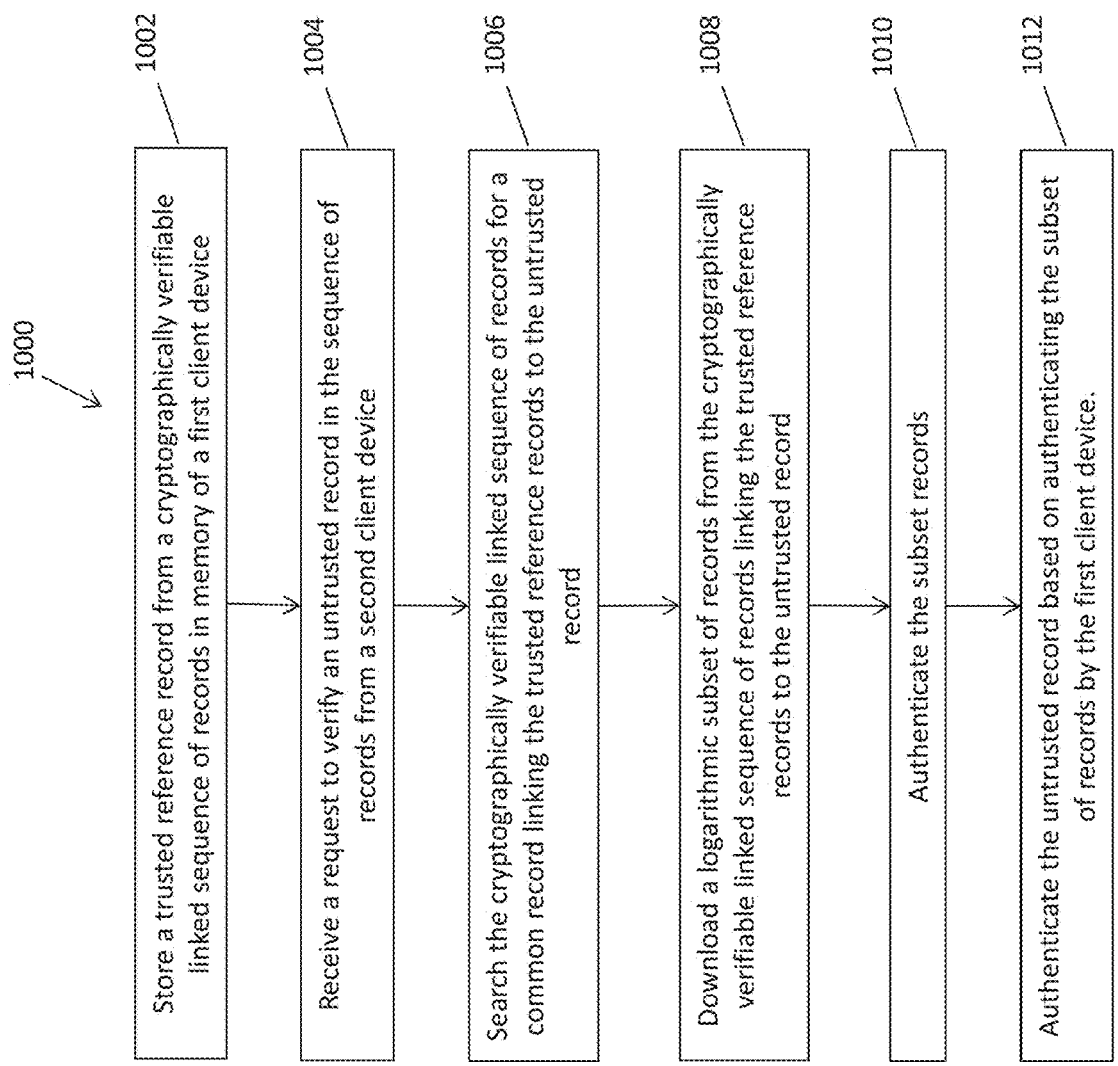
FIG. 10 is a flowchart illustrating another example process for verifying a reference record in a cryptographically verifiable linked sequence of records.

FIG. 10 is a flowchart illustrating an example process 1000 for verifying a reference record in a cryptographically verifiable linked sequence of records having multi-hop backward and forward links. At step 1002, a first client device stores in its memory a known (trusted) reference record associated with the cryptographically verifiable linked sequence of records maintained by one or more nodes in a decentralized peer-to-peer environment. At step 1004, the client device receives a request from a second client device that includes an untrusted reference record which is purported to be associated with the cryptographically verifiable linked sequence of records maintained by one or more nodes in a decentralized peer-to-peer environment. At step 1006, the first client searches for a common record linking the trusted reference record to the untrusted record, and at step 1008, the first client device downloads and stores in memory a subset of records from the cryptographically verifiable linked sequence of records from one or more of the nodes between the trusted reference records and the common record and between the common record and the untrusted record. The subset of records downloaded from the cryptographically verifiable linked sequence of records includes a quantity of records that is a logarithmic function of a total quantity of records between the trusted reference record and the common records and between the common record and the untrusted record based on the multi-hop link structure of linked sequence of records, as described herein. At step 1010, the first client device verifies the authenticity of the subset of records by performing one or more proofs of work and/or using one more public keys associated with the subset of records, and at step 1012, the first client device authenticates the untrusted record based on the authentication of the subset of records. The public keys can be collective public keys associated with entities acting as a head of trust at the time the records in the subset are created. In some embodiments, the public keys can be stored in records of a separate cryptographically verifiable linked sequence of key records with multi-hop backward and forward links. Each key record can include the members that formed the entity associated with the key, the member's public keys, and/or the entity's collective public. At least one key record from the separate cryptographically verifiable linked sequence of key records can be linked to at least one of the records in the subset of records, and the first client device can use the link to retrieve the public keys from the appropriate key records.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The foregoing description of the specific embodiments of the subject matter disclosed herein has been presented for purposes of illustration and description and is not intended to limit the scope of the subject matter set forth herein. It is fully contemplated that other various embodiments, modifications and applications will become apparent to those of ordinary skill in the art from the foregoing description and accompanying drawings. Thus, such other embodiments, modifications, and applications are intended to fall within the scope of the following appended claims. Further, those of ordinary skill in the art will appreciate that the embodiments, modifications, and applications that have been described herein are in the context of particular environment, and the subject matter set forth herein is not limited thereto, but can be beneficially applied in any number of other manners, environments and purposes. Accordingly, the claims set forth below should be construed in view of the full breadth and spirit of the novel features and techniques as disclosed herein.

The invention claimed is:

1. A method of cryptographically storing information for retrieval and verification in a decentralized network, the method comprising:
    adding one or more new records to a cryptographically verifiable linked sequence of records;
    generating, for the one or more new records added to the sequence, backwards links to previously added records by creating cryptographic hashes based on the previously added records; and
    retroactively adding forward links to at least one of previously added records in response to the one or more new records being added to the sequence,
    wherein the backwards links and forward links include multi-hop links and a quantity of records needed to verify a select record in the sequence is a logarithmic function of a total quantity of records in the sequence, and wherein each of the one or more new records are assigned a height value that determines a quantity of backwards links that are generated for each of the one or more new records and levels associated with the backwards links.

2. The method of claim 1, wherein a quantity of hops of the backwards links is determined based on the levels.

3. The method of claim 2, wherein a quantity of records associated with each of the levels exponentially decreases as the levels increase.

4. The method of claim 1, wherein each of the one or more new records are assigned a height value that determines a quantity of forward links that are generated for each of the one or more new records and levels associated with the backwards links.

5. The method of claim 1, further comprising:
generating record identifiers for each of the one or more new records based on payload data included in the one or more new records and the backwards links.

6. The method of claim 5, wherein generating the record identifiers comprises:
computing a hash of the payload data and the backwards links for each of the one or more new records.

7. The method of claim 1, wherein the retroactively adding forward links to at least one of previously added records in response to the one or more new records being added to the sequence comprises:
creating cryptographic signatures of record identifiers of the one or more new records; and
adding the cryptographic signatures to the at least one of the previously added records.

8. The method of claim 7, wherein creating the cryptographic signatures of the record identifiers comprises:
creating individual cryptographic signatures from each member of a head of trust based on a private key associated with each member; and
combining the individual cryptographic signatures to form a collective cryptographic signature.

9. The method of claim 8, further comprising:
combining individual public keys from each member to generate a collective public key.

10. The method of claim 9, wherein the head of trust is exists at the time the at least one previously added record is created and continues to exist until forward links are created in the at least one previously added record are created for each available forward link slot.

11. The method of claim 10, wherein head of trust ceases to exist upon creating the forward links for each of the available forward link slots.

12. A method of cryptographically storing information for retrieval and verification in a decentralized network, the method comprising:
adding one or more new records to a cryptographically verifiable linked sequence of records;
generating, for the one or more new records added to the sequence, backwards links to previously added records by creating cryptographic hashes based on the previously added records; and
retroactively adding forward links to at least one of previously added records in response to the one or more new records being added to the sequence,
wherein the backwards links and forward links include multi-hop links and a quantity of records needed to verify a select record in the sequence is a logarithmic function of a total quantity of records in the sequence,
wherein each of the one or more new records are assigned a height value that determines a quantity of forward links that are generated for each of the one or more new records and levels associated with the backwards links, and
wherein a quantity of hops of the forward links is determined based on the levels.

13. The method of claim 12, wherein a quantity of records associated with each of the levels exponentially decreases as the levels increase.

14. The method of claim 12, wherein creating the cryptographic signatures of the record identifiers comprises:
creating individual cryptographic signatures from each member of a head of trust based on a private key associated with each member; and
combining the individual cryptographic signatures to form a collective cryptographic signature, and
wherein the method further comprises:
combining individual public keys from each member to generate a collective public key.

15. The method of claim 14, wherein the head of trust is exists at the time the at least one previously added record is created and continues to exist until forward links are created in the at least one previously added record are created for each available forward link slot.

16. The method of claim 15, wherein head of trust ceases to exist upon creating the forward links for each of the available forward link slots.

17. The method of claim 12, wherein each of the height value determines a quantity of backwards links that are generated for each of the one or more new records and levels associated with the backwards links.

18. The method of claim 17, wherein a quantity of hops of the backwards links is determined based on the levels.

19. The method of claim 12, further comprising:
generating record identifiers for each of the one or more new records based on payload data included in the one or more new records and the backwards links.

20. The method of claim 19, wherein generating the record identifiers comprises:
computing a hash of the payload data and the backwards links for each of the one or more new records.

21. A method of cryptographically storing information for retrieval and verification in a decentralized network, the method comprising:
adding one or more new records to a cryptographically verifiable linked sequence of records;
generating, for the one or more new records added to the sequence, backwards links to previously added records by creating cryptographic hashes based on the previously added records; and
retroactively adding forward links to at least one of previously added records in response to the one or more new records being added to the sequence,
wherein the backwards links and forward links include multi-hop links and a quantity of records needed to verify a select record in the sequence is a logarithmic function of a total quantity of records in the sequence,
wherein the retroactively adding forward links to at least one of previously added records in response to the one or more new records being added to the sequence comprises:
creating cryptographic signatures of record identifiers of the one or more new records; and
adding the cryptographic signatures to the at least one of the previously added records, and wherein creating the cryptographic signatures of the record identifiers comprises:
creating individual cryptographic signatures from each member of a head of trust based on a private key associated with each member; and
combining the individual cryptographic signatures to form a collective cryptographic signature.

22. The method of claim 21, further comprising:
combining individual public keys from each member to generate a collective public key.

23. The method of claim 21, wherein the head of trust is exists at the time the at least one previously added record is created and continues to exist until forward links are created in the at least one previously added record are created for each available forward link slot.

24. The method of claim 23, wherein head of trust ceases to exist upon creating the forward links for each of the available forward link slots.

25. A system for cryptographically storing information for retrieval and verification in a decentralized network, the method comprising:
a plurality of nodes in the decentralized network, the plurality of nodes configured to add one or more new records to a cryptographically verifiable linked sequence of records and generate, for the one or more new records added to the sequence, backwards links to previously added records by creating cryptographic hashes based on the previously added records; and
a collective authority system in the decentralized network, the collective authority system configured to retroactively add forward links to at least one of previously added records in response to the one or more new records being added to the sequence,
wherein the backwards links and forward links include multi-hop links and a quantity of records needed to verify a select record in the sequence is a logarithmic function of a total quantity of records in the sequence, and
wherein the collective authority assigns each of the one or more new records a height value that determines a quantity of forward links that are generated for each of the one or more new records and levels associated with the backwards links.

26. The system of claim 25, wherein a quantity of hops of the forward links is determined based on the levels.

27. The method of claim 26, wherein a quantity of records associated with each of the levels exponentially decreases as the levels increase.

28. A method of verifying a reference record in a cryptographically verifiable linked sequence of records, the method comprising:
downloading a logarithmic quantity of records from the cryptographically verifiable linked sequence of records, each one of the records having an assigned height level that determines a quantity of backwards or forward links each one of the records includes and levels associated with the backwards or forwards links;
receiving a request to verify a first record in the sequence of records;
traversing the logarithmic quantity of records according to the levels to identify a second record associated with the first record; and
authenticating the first record based on authenticating the second record,
wherein a quantity of hops of the backwards links or the forward links is determined based on the levels.

29. The method of claim 28, wherein the first record is associated with a software update.

30. The method of claim 28, wherein the first record is associated with a micro-payment or a smart contract.

31. A non-transitory computer-readable medium comprising instructions executable by a processing device, wherein execution of the instructions by the processing device causes the processing device to:
add one or more new records to a cryptographically verifiable linked sequence of records;
generate, for the one or more new records added to the sequence, backwards links to previously added records by creating cryptographic hashes based on the previously added records; and
retroactively add forward links to at least one of previously added records in response to the one or more new records being added to the sequence,
wherein the backwards links and forward links include multi-hop links and a quantity of records needed to verify a select record in the sequence is a logarithmic function of a total quantity of records in the sequence, and
wherein each of the one or more new records are assigned a height value that determines a quantity of backwards links that are generated for each of the one or more new records and levels associated with the backwards links.

32. A system of cryptographically storing information for retrieval and verification in a decentralized network, the system comprising:
a plurality of nodes in the decentralized network, the plurality of nodes configured to add one or more new records to a cryptographically verifiable linked sequence of records and generate, for the one or more new records added to the sequence, backwards links to previously added records by creating cryptographic hashes based on the previously added records; and
a collective authority system in the decentralized network, the collective authority system configured to retroactively add forward links to at least one of previously added records in response to the one or more new records being added to the sequence,
wherein the backwards links and forward links include multi-hop links and a quantity of records needed to verify a select record in the sequence is a logarithmic function of a total quantity of records in the sequence, and
wherein each of the one or more new records are assigned a height value that determines a quantity of forward links that are generated for each of the one or more new records and levels associated with the backwards links, and
wherein a quantity of hops of the forward links is determined based on the levels.

33. A non-transitory computer-readable medium comprising instructions executable by a processing device, wherein execution of the instructions by the processing device causes the processing device to:
add one or more new records to a cryptographically verifiable linked sequence of records;
generate, for the one or more new records added to the sequence, backwards links to previously added records by creating cryptographic hashes based on the previously added records; and
retroactively add forward links to at least one of previously added records in response to the one or more new records being added to the sequence, wherein the backwards links and forward links include multi-hop links and a quantity of records needed to verify a select record in the sequence is a logarithmic function of a total quantity of records in the sequence, wherein each of the one or more new records are assigned a height value that determines a quantity of forward links that are generated for each of the one or more new records and levels associated with the backwards links, and wherein a quantity of hops of the forward links is determined based on the levels.

34. A system for cryptographically storing information for retrieval and verification in a decentralized network, the system comprising:

a plurality of nodes in the decentralized network, the plurality of nodes configured to add one or more new records to a cryptographically verifiable linked sequence of records and generate, for the one or more new records added to the sequence, backwards links to previously added records by creating cryptographic hashes based on the previously added records; and a collective authority system in the decentralized network, the collective authority system configured to retroactively add forward links to at least one of previously added records in response to the one or more new records being added to the sequence, wherein the backwards links and forward links include multi-hop links and a quantity of records needed to verify a select record in the sequence is a logarithmic function of a total quantity of records in the sequence, and wherein the retroactively adding forward links to at least one of previously added records in response to the one or more new records being added to the sequence comprises:

creating cryptographic signatures of record identifiers of the one or more new records, and adding the cryptographic signatures to the at least one of the previously added records, and wherein creating the cryptographic signatures of the record identifiers comprises:

creating individual cryptographic signatures from each member of a head of trust based on a private key associated with each member, and combining the individual cryptographic signatures to form a collective cryptographic signature.

35. A non-transitory computer-readable medium comprising instructions executable by a processing device, wherein execution of the instructions by the processing device causes the processing device to:

add one or more new records to a cryptographically verifiable linked sequence of records;

generate, for the one or more new records added to the sequence, backwards links to previously added records by creating cryptographic hashes based on the previously added records; and retroactively add forward links to at least one of previously added records in response to the one or more new records being added to the sequence, wherein the backwards links and forward links include multi-hop links and a quantity of records needed to verify a select record in the sequence is a logarithmic function of a total quantity of records in the sequence, wherein the retroactively adding forward links to at least one of previously added records in response to the one or more new records being added to the sequence comprises:

creating cryptographic signatures of record identifiers of the one or more new records, and adding the cryptographic signatures to the at least one of the previously added records, and wherein creating the cryptographic signatures of the record identifiers comprises:

creating individual cryptographic signatures from each member of a head of trust based on a private key associated with each member, and combining the individual cryptographic signatures to form a collective cryptographic signature.

* * * * *